Aug. 13, 1968   W. R. PIERCE   3,397,395
FILTER CONDITION INDICATOR
Filed Sept. 20, 1965

INVENTOR.
William R. Pierce
BY Robert L. Spencer
ATTORNEY

United States Patent Office 3,397,395
Patented Aug. 13, 1968

3,397,395
FILTER CONDITION INDICATOR
William R. Pierce, Flint, Mich., assignor to General Motors Corporation, Detroit, Mich., a corporation of Delaware
Filed Sept. 20, 1965, Ser. No. 488,501
6 Claims. (Cl. 340—239)

This invention relates to filter condition indicators and more particularly to a device that is actuated by a predetermined pressure drop across the filter element to provide a visual or audible warning of such a pressure drop.

This invention is particularly designed for air cleaning apparatus used on an internal combustion engine, but it may be used in any air filtering equipment.

The condition indicating instruments of the modern automotive vehicle have evolved to simple indication lights such as those used to indicate oil pressure or no oil pressure, charging or discharging of the battery, etc. In most automobiles, to determine the condition of the filter in an air cleaner, the air cleaner must be disassembled and the filter element inspected. Such an inconvenient method of determining the air filter condition results in many people ignoring the condition of their air filter so that an excessively rich fuel-air mixture and often a fuel-air mixture with air contaminants that have not been filtered therefrom are induced into the induction engine which eventually lead to motor damage or failure.

It is an object of this invention to provide an air filter indicator that may indicate the need for filter replacement or cleaning by audible or visual signals.

In designing the present air filter condition indicator, it was decided to use the pressure drop of the air from one side of the air filter to the other as the means for determining when a filter should be replaced. Because of the variation in air flow at different speeds and throttle settings, it was found that compensation was needed in the indicating device to balance the variables for proper indication of the filter's condition.

In the present invention the compensation takes the form of a pressure compensator which allows the indicator to sense the restriction build-up in the filter element. It was found that the air pressure in the snorkel tube and in the clean air compartment of the air cleaner shroud were equal in all conditions of air flow. By using these two pressures as opposed forces in the operation of the indicator, a balance of pressure exists when a clean element is installed, and as the filter element becomes dirty, the clean air side pressure drops and an inbalance exists which is proportionate to the element restriction build-up. A precalibrated spring assists the clean air pressure to allow for the predetermined restriction build-up considered allowable in the filter element.

Another object of this invention is to provide a filter condition indicator that will indicate the condition of the air filter by means of the pressure drop through the filter as the restriction build-up of the filter increases due to clogging by dirt and dust.

A further object of this invention is to provide a compensated filter condition indicator in which a precalibrated spring is used to control the indicating device so that when a predetermined filter restriction is built-up therein, an electrical circuit will be completed to actuate a visual or audible signal indicating the air filter requires changing.

These and other objects of this invention will become more apparent as reference is had to the accompanying specification and drawings in which.

Figure 1:
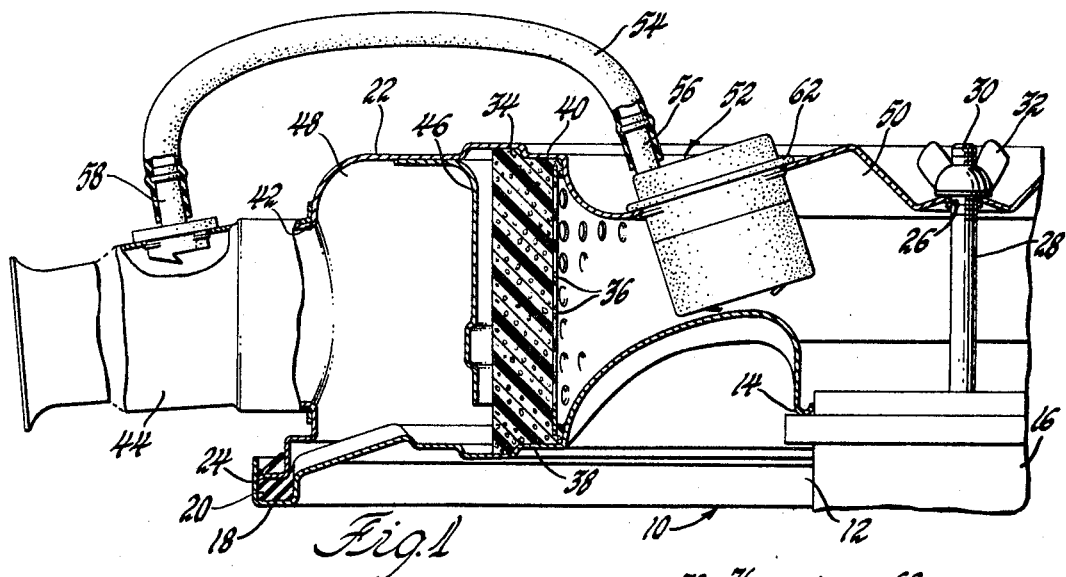
FIGURE 1 is a view of an air cleaner silencer assembly, with parts broken away and in section, and illustrating the filter condition indicator device of the present invention mounted on the air cleaner silencer.

Referring more particularly to the drawings, FIGURE 1 illustrates a typical air cleaner silencer assembly which may be mounted on an internal combustion engine. The air cleaner silencer assembly indicated generally by the numeral 10 includes a lower shroud 12 that is provided with a shoulder 14 which engages the carburetor inlet tube 16 of an internal combustion engine. The outer extremity of the lower shroud 12 includes a channel section 18 which receives a suitable gasket 20. An upper cover 22 is provided with a rolled edge 24 that engages the gasket 20 in the channel 18. The cover 22 has a central aperture 26 formed therein for receiving a stud 28 secured in any suitable manner in the inlet tube 16. The end of the stud 28 is threaded as at 30 to receive a wing nut or the like 32 for securing the cover 22 and the shroud 12 in assembled relationship as a housing for the air cleaner.

An annular filter element 34 of any suitable material, such as polyurethane foam, is mounted between and within the cover 22 and the lower shroud 12. The outer surface of the filter element being the upstream side and the inner surface being the downstream side for indicating the direction of air flow therethrough. An annular support screen 36 for providing the necessary stiffening for the filter element 34 is mounted within or on the downstream side of the filter element 34. The filter element 34 and screen 36 are sealed and held in place against the shoulders 38 and 40 of the shroud 12 and cover 22, respectively. A portion of the surface of the cover 22 is flanged outwardly as at 42 for receiving an air inlet tube or snorkel 44 in any suitable manner as by the telescoping arrangement, illustrated in FIGURE 1. A baffle plate 46 is secured inside the cover 22 by suitable means and is spaced from the filter 34 opposite the opening in the cover 22 where the snorkel tube 44 is mounted. The baffle plate 46 protects the filter 34 from direct impingement of the air entering the air cleaner from the snorkel tube 44, and deflects the air into an annular dirty or contaminated air inlet compartment 48 between the cover 22 and the upstream side of the filter 44. The contaminated air from compartment 48 is filtered through the filter element 34 and screen 36 into the filtered air compartment 50 formed about the air inlet tube 16 by the screen 36, shroud 12 and cover 22. The filtered air then passes from the filtered air compartment into the engine through the air inlet tube 16.

A filter condition indicator, indicated generally by the numeral 52, is secured in the cover 22 with a portion extending within the clean air compartment 50 on the downstream side of the filter element 34 and a portion exposed to the atmosphere. A flexible tube 54 has one end connected to a snorkel tube inlet 56 of the filter condition indicator and the other end is secured to the snorkel tube contaminated air tap 58 for admitting air to the filter condition indicator under pressure of the air in the snorkel tube.

Figures 2, 3:
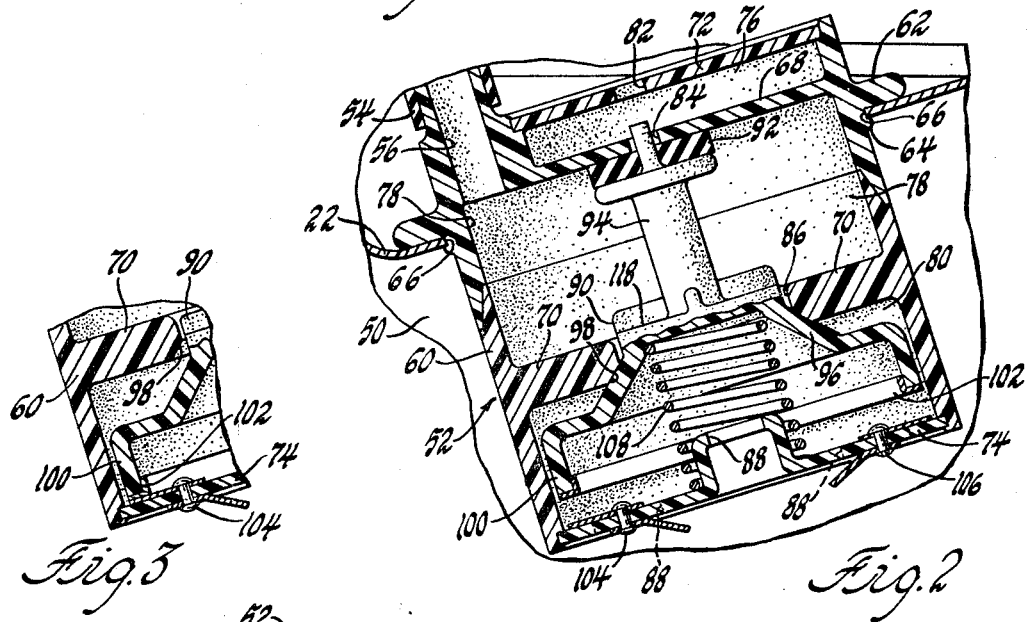
FIGURE 2 is an enlarged sectional view of the filter condition indicator in the closed or satisfactory filter condition position.
FIGURE 3 shows a portion of the filter condition indicator in the open or dirty filter condition position.

Referring now to FIGURE 2, the filter condition indicator 52 includes a cylindrical housing or case 60 having an external flange 62 with adjacent tab portions 64 for securing the filter indicator in the aperture 66 of the cover 22. The interior of the housing 60 is divided into three chambers by a pair of internal walls 68, 70 and a pair of end plates 72, 74 respectively. The end plate 72 is secured to the housing 60 by suitable means and cooperates with the internal wall 68 to form the first chamber 76. A second or inner chamber 78 is located between the internal wall 68 and 70, and the third chamber 80 is formed between the inner wall 70 and the end plate 74 which is secured in the housing 60 by a snap ring or other suitable means.

The first chamber 76 communicates with the atmosphere through an aperture or port 82 formed in the end plate 72 and with the chamber 78 by means of an aperture 84 formed in the inner wall 68. The inner chamber 78 also communicates with the chamber 80 by means of an aperture or passage 86 formed in the inner wall 70 and is also connected to the snorkel tube inlet 56. The chamber 80 also communicates with the clean air compartment through a plurality of holes or apertures 88 formed in the end plate 74.

A piston 90 is mounted within said housing for reciprocable movement between open and closed positions, as shown in FIGURE 2 and FIGURE 3, respectively. The piston 90 has a land portion 92 for effectively sealing the aperture 84 when the piston is in closed position, as shown in FIGURE 2. A stem portion 94 connects the land 92 with a conical valve portion 96 that coperates with a valve seat 98 formed in the passage 86 of the inner wall 70 when the piston is in the closed position. A skirt portion 100 extends from the valve section 96 toward the end plate 74 and terminates in a plane substantially parallel to end plate 74 and spaced therefrom when the piston 90 is in the closed position, as shown in FIGURE 2. The skirt portion 100 is closely adjacent the external wall of housing 60 but does not contact the wall. A conducting ring 102 is positioned and secured by suitable means on the terminating plane of the skirt portion 100. A pair of fixed contacts 104, 106, respectively, are secured to the end plate 74 for contacting the conducting ring 102 when the piston 90 moves from the closed position, shown in FIGURE 2, to the open position, shown in FIGURE 3.

A precalibrated compression spring 108 has one end bearing against end plate 74 and the other end bearing against the piston 90 for biasing the piston to the closed position.

Figure 4:
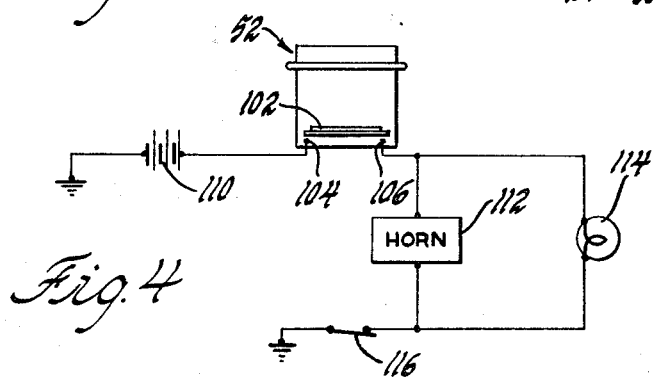
FIGURE 4 is a schematic wiring diagram of the filter condition indicator illustrating the circuit for actuating the horn or light indicator.

Referring now to FIGURE 4, a schematic wiring diagram of the warning system for the filter condition indicator is shown. A power source such as a battery 110 is connected to ground and to terminal 104 of the filter condition indicator 52. The conducting ring 102 of the filter condition indicator acts as a normally open switch which closes the circuit between contact 104 and 106 when the biasing action of spring 108 is overcome and the piston 90 moves to the open position, as shown in FIGURE 3. When the conducting ring 102 connects terminal 104, 106 the current then flows from terminal 106 through either a horn 112 or an indicating signal light 114 or both and then through normally closed switch 116 to a ground for completing the circuit. The normally closed switch 116 is included in the circuit for the convenience of the vehicle operator to stop the horn when the condition of the filter has been noted. Should just a signal light such as 114 be included in the circuit, a switch 116 would not necessarily be required.

In the operation of the filter condition indicator 52, when a new filter element 34 has been placed in the air cleaner silencer assembly, the pressure of the contaminated air passing through snorkel tube 44 and the clean air passing through the filtered air compartment 50 is the same. Since the pressure in the snorkel tube 44 and in the filtered air compartment 50 are the same, the pressure in chambers 78 and 80 on each side of the piston 90 are equal and the biasing action of the spring 108 will maintain a piston 90 in the closed position, shown in FIGURE 2, where the land 92 will block the aperture 84 sealing chamber 78 from connection with the atmosphere and the valve portion 96 cooperating with the valve seat 98 will seal communication between chambers 78 and 80. If an audio signal device is not intended to be connected to aperture 82, the chamber 76 could be eliminated from the structure. Dirt and contamination is built-up on filter element 34 by its filtering action of the contamianted air passing therethrough, the air pressure within the filtered air compartment will be decreased relative to the air pressure in the snorkel tube 44 when the restrictions in the filter element 34 caused by the build-up of accumulated dirt and contamination have reached a predetermined point as indicated by the pressure differential of the snorkel tube and filtered air compartment. The force of the compression spring 108 will be overcome by the higher pressure of the snorkel tube air acting in chamber 78 against the face 118 of the piston 90 and the piston 90 will be moved toward its open position. As the piston 90 is moved towards its open position, the land 92 will be moved from aperture 84 permitting the higher pressures of the atmosphere air to enter chamber 78 to assist the movement of the piston 90 to its open position. The initial movement of the piston 90 towards its open positiond also exposes a larger area including the conical valve portion and a portion of the skirt to the higher pressure air in chamber 78, hence causing a more rapid movement of the piston 90 to its open position, as shown in FIGURE 3. When the terminal plane of piston 100 contacts the end plate 74 it will be held in that position by the higher pressure from chamber 78 bearing against the piston 90 and the circuit extending from terminal 104 to 106 will be closed to actuate the warning system of the horn 112 and the light 114. A seal is also provided by contacting of the terminal plane and end plate 74 for preventing contaminated air from the snorkel tube or atmosphere from entering the filtered air compartment.

If another audible signal is desired, a conventional whistle or reed type noise maker may be connected to the port 82 for actuation by the atmosphere air passing into chamber 78 through chamber 76.

Thus it can be seen that by using the comparable air pressures of the snorkel tube air and the filtered air, which have been found by experimentation to be equal through all ranges of throttle setting and air flow, a precalibrated spring 108 may be used to indicate when a predetermined restriction build-up has accumulated on the filter 34 such that the filter element needs to be replaced and provides a warning system for so advising the operator of the vehicle.

While but one embodiment has been shown and described it is obvious that there are many modifications which may be made without departing from the spirit and scope of the following claims.

I claim:

1. In combination in an air cleaner for an internal combustion engine having a housing including an air inlet snorkel tube, an air outlet attached to the air inlet of said internal combustion engine, a contaminated air compartment connected to said air inlet snorkel tube and a filtered air compartment connected to said air outlet; an air filter positioned within said housing for effectively separating said contaminated air compartment from said filtered air compartment and filtering air passing therebetween, a filter condition indicator mounted on said housing for indicating air flow through said filter by utilizing pressure differentials of said snorkel tube and said filtered air compartment; said filter condition indicator including a cylindrical case having a base wall and top wall, a first chamber and a second chamber therein, said first chamber extending from said top wall and having an opening in said top wall communicating with said snorkel tube and an air inlet port communicating with the atmosphere, an inner wall within said case separating said chambers, said second chamber extending from said inner wall to said base wall, said second chamber having holes in said base wall for communicating with said filtered air compartment, an aperture in said inner wall providing communication between said chambers, said inner wall having a conical valve seat formed in said aperture, a piston within said case extending through said aperture and having a first position and a second position, spring means biasing said piston to said first position; said piston having a land for blocking said air inlet port in said first position, a conical valve portion for cooperating with said conical valve seat for effectively blocking said aperture in said first position, a valve stem connecting said land and said conical valve portion, a skirt portion extending from said conical valve portion toward said base wall and terminating in a plane spaced from said base wall when in said first position, and a conducting ring positioned on said skirt portion adjacent said base wall; a first terminal and a second terminal secured on said base wall, said conducting ring on said piston spaced from said base wall in said first position and contacting said terminals on said base wall in said second position for completing a circuit between said terminals, and a warning circuit including a power source electrically connected to said first terminal and to ground, a warning means connected to said second terminal and to ground, and independent manual switch means in series in said circuit.

2. Apparatus as claimed in claim 1 having said spring biasing means being a precalibrated spring for exerting a force on said piston equivalent to the tolerable pressure drop allowable in said clean air compartment due to restriction build-up of contaminants in said air filter.

3. A filter condition indicator for an air cleaner silencer having a housing, snorkel tube air inlet connected thereto, a filter element in said housing for removing contaminants from air passing therethrough, said filter having an upstream side and a downstream side, an air outlet in said air cleaner silencer assembly on the downstream side of said filter, a filter condition indicator secured to said housing and extending into said housing on the downstream side of said filter, said filter condition indicator including a case having a first chamber and a second chamber therein, said first chamber communicating with said filtered air compartment of said air cleaner silencer assembly and said second chamber communicating with said snorkel tube, an internal wall in said case for separating said chambers, said wall having a passage therein for communication between said chambers, a piston reciprocably mounted within said case, said piston having a closed position for effectively sealing said passage in said wall separating said chambers and an open position for permitting communication between said chambers through said passage, spring biasing means urging said piston to said closed position, said second chamber having an aperture therein for communicating with the atmosphere, said piston having a land thereon for sealing such aperture communicating with the atmosphere when said piston is in closed position, and means for indicating movement of said piston from said closed position to said open position when the pressure differential in the chambers exceeds said spring biasing means effective force.

4. Apparatus as claimed in claim 3 wherein said indicating means includes a conducting ring secured to said piston for movement therewith, a first terminal and a second terminal mounted on said case and positioned for contacting said conducting ring when said piston is in said open position, a grounded power source electrically connected to said first terminal, a warning means electrically connected to said second terminal and to ground whereby the warning means is actuated by the conducting ring electrically connecting said terminals when the piston is in open position.

5. A filter condition indicator for an air cleaner silencer having a housing, a snorkel tube air inlet connected thereto, a filter element in said housing for removing contaminants from air passing therethrough whereby such removal of contaminants creates a restriction build-up on said filter element and reduces the amount of air that can be passed therethrough for a given air pressure, said filter having an upstream side and a downstream side, a filtered air compartment in said air cleaner silencer assembly on the downstream side of said filter, an air outlet in said air cleaner silencer assembly opening from said filtered air compartment, a filter condition indicator for indicating restriction build-up in said filter element including a first chamber connected to said snorkel tube for receiving in said first chamber air under the same pressure as that therein, a port in said first chamber for connecting said first chamber to the atmosphere, a second chamber having an opening for connecting said second chamber to said filtered air compartment for receiving in said second chamber air under the same pressure as that therein, a passage connecting said chambers, sealing means having a closed position and an open position, said sealing means effectively sealing said passage and said port and allowing communication between said second chamber and said filtered air compartment through said opening when in said closed position, said sealing means effectively sealing said opening and allowing communication between said chambers, said snorkel tube and the atmospher when in said open position, said spring means biasing said sealing means to said closed position, and indicating means for indicating movement of said sealing means to said open position.

6. Apparatus as claimed in claim 5 having said spring means precalibrated for biasing said sealing means to said closed position until restriction build-up in said filter element creates a predetermined pressure differential in said chambers whereby said sealing means would be moved to said open position for actuating the indicating means and showing the restriction build-up in said filter.

References Cited

UNITED STATES PATENTS

| 2,882,854 | 4/1959 | Schroeder | 116—117 |
|---|---|---|---|
| 2,949,976 | 8/1960 | Tuthill | 55—274 |

FOREIGN PATENTS 345,440  3/1931  Great Britain.

JOHN W. CALDWELL, *Primary Examiner.*

D. MYER, *Assistant Examiner.*